H. P. KRAFT.
TIRE VALVE.
APPLICATION FILED JUNE 15, 1916.

1,305,552.                                              Patented June 3, 1919.

WITNESSES:

INVENTOR
Henry P. Kraft
By Attorneys,

UNITED STATES PATENT OFFICE.

HENRY P. KRAFT, OF RIDGEWOOD, NEW JERSEY.

TIRE-VALVE.

1,305,552.  Specification of Letters Patent.  Patented June 3, 1919.

Original application filed July 25, 1914, Serial No. 853,126. Divided and this application filed June 15, 1916. Serial No. 103,845.

*To all whom it may concern:*

Be it known that I, HENRY P. KRAFT, a citizen of the United States of America, residing in Ridgewood, in the county of Bergen and State of New Jersey, have invented certain new and useful Improvements in Tire-Valves, of which the following is a specification.

This application is a division of my application filed July 25, 1914, Serial No. 853,126.

This invention relates to tire valves, and aims to provide certain improvements therein.

The invention is directed toward that form of tire or other valve which normally has a spring pressing the valve to its seat, although it may be used in connection with valves which are loosely mounted, and require air or other pressure to close them in use. Spring-pressed valves have very largely gone into use for pneumatic tires or similar purposes, the spring being desirable to insure tight closing of the valve, particularly under low pressure. In tire valves or other small valves, particularly of the Schrader type, the valve mechanism, comprising a valve proper and its seat, are removable bodily from the shell or casing, and the spring is placed under tension during the act of insertion. In such valves the valve proper is necessarily very small, and its seating face is composed of rubber which by reason of the small size of the valve proper cannot be made of large dimensions. Practice has shown that the packing of the valve must be more or less resilient, and a comparatively soft rubber is hence used for this purpose.

It has been found in practice that with this type of valve the pressure of the valve against its seat is apt to form a depression in the rubber packing. This is necessary in the operation of the valve in use, but while the valve is not in use such pressure is detrimental. After the valves are manufactured considerable time often elapses before they go into use and it is the object of the present invention to provide means for depressing the valve to hold it away from its seat during such time, so that when the valve is put in use the valve packing still has a smooth and efficient seating surface.

According to the present invention the unseating or pressing means is arranged upon a cap, so that not only does the cap act as a deflator, but it is also held connected with the valve shell before the valve is placed in use.

In the drawings, which show several modifications of the invention,—

Figure 1:
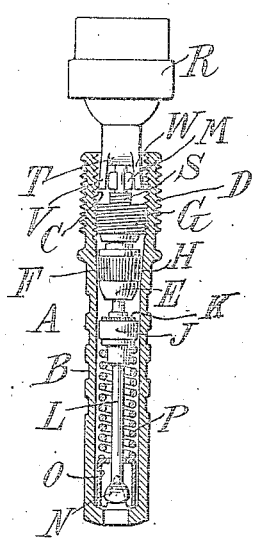
Figure 1 is a diametrical section of a valve showing one form of depressor applied thereto.
Figure 2:
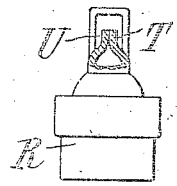
Fig. 2 is a view of the cap, partly in section.

Referring first to Figs. 1 and 2, let A indicate a tire valve which comprises a shell B of suitable dimensions having an internal screw-thread C at its top and an external screw-thread D also at its top. E is the valve seat which is provided with a packing F of rubber or other suitable material, and G is a screw-threaded plug which is swiveled to the seat member E, so that when the plug G is screwed down within the shell it presses the seat downwardly until the packing F makes contact with a tapered shoulder H. J is the valve proper which is provided with a packing K adapted to make contact with the seat E. The plug G and seat E are provided with a bore through which passes a pin L connected to and preferably running through the valve proper J. The lower end of the pin passes through a sheet metal guide O between which and the valve proper is located a loading spring P. The top of the pin L is upset or swaged, as shown at M, and its bottom is similarly upset or swaged, as shown at N. The pin acts to hold all of the parts together, and as its ends are enlarged by the swaged portions M and N, none of the parts can become separated. The spring P normally presses the valve proper J upwardly, so that the packing K is always in contact with the seat E except when the valve is depressed during the pumping operation. This constant contact of the packing K and seat E is injurious to the packing. It cannot be avoided when the valve is in use, but while the valve is being carried in stock or before it is used, this contact is unnecessary and injurious to the packing of the valve often causing leakage.

According to the invention herein described the deflator is formed on the valve cap R. The base of this cap may be of usual construction and is provided with an internal screw-thread adapted to screw on the nipple of the valve shell when in its normal position, whereby to make a leak-tight closure for the valve shell. The internal structure of the cap is not shown, since this construction is well known. Such valve caps are each, moreover, usually provided with a projection at its outer end which is designed to enter the valve shell and unscrew the plug G by engagement with the projecting portion S of the plug.

In the construction illustrated in Figs. 1 and 2 the metal at the upper end of the projection of the cap is forced together at T and U between the projections V and W, thus forming an abutment which engages the valve pin, as shown in Fig. 1. The projections V and W are still useful to unscrew the plug G, as is common, while being sufficiently sprung apart to engage the valve casing by friction.

Figure 3:
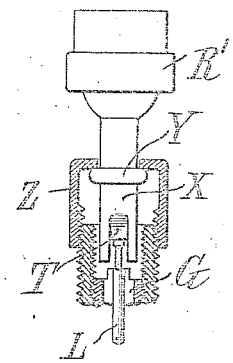
Fig. 3 is an elevation of another form of cap showing the top of the valve, partly in section.

In Fig. 3 the upper end of the cap R' is elongated, as shown at X, and is provided with the same inwardly pressed portions T (and U), as are shown in Figs. 1 and 2. The upper end of the cap is also formed with a stop Y which serves to prevent the escape of a screw coupling Z. The latter is designed to engage the valve casing and press the cap downwardly until the pin is depressed. When it is desired to use the cap to unscrew the plug G the coupling Z is slid upwardly and out of the way.

When the valves are assembled, ready for shipping, the cap R is reversed and engaged with the valve shell, the friction or coupling holding the cap in place. When the valve is applied to the tube and is ready for use the cap will, of course, be reversed and thereafter perform the normal function of a cap.

While I have shown and described several forms of the invention, it will be understood that I do not wish to be limited thereto, since various changes can be made therein without departing from the spirit of the invention.

What I claim is:—

1. A tool having a screw driver portion adapted to enter a valve shell to engage a valve part for rotating the same, and said screw driver portion having a portion to depress a valve pin when so inserted, and means for holding said tool in inserted position to hold the pin depressed.

2. A tool having a screw driver portion adapted to enter a valve shell to engage a valve part for rotating the same, and said screw driver portion having a portion to depress a valve pin when so inserted, and frictional means for holding said tool in inserted position to hold the pin depressed.

3. A tool having a screw driver portion adapted to enter a valve shell to engage a valve part for rotating the same, and said screw driver portion having a portion to depress a valve pin when so inserted, and frictional means engaging the interior of such shell for holding said tool in inserted position to hold the pin depressed.

4. A cap having a screw driver portion adapted to enter a valve shell to engage a valve part for rotating the same, and said screw driver portion having a portion to depress a valve pin when so inserted, and means for holding said screw driver portion in inserted position to hold the pin depressed.

5. A cap having a screw driver portion adapted to enter a valve shell to engage a valve part for rotating the same, and said screw driver portion having a portion to depress a valve pin when so inserted, and frictional means for holding said screw driver portion in inserted position to hold the pin depressed.

In witness whereof, I have hereunto signed my name.

HENRY P. KRAFT.